(12) United States Patent
Chen et al.

(10) Patent No.: US 11,211,690 B2
(45) Date of Patent: Dec. 28, 2021

(54) MIDDLE FRAME ASSEMBLY AND ELECTRONIC DEVICE

(71) Applicant: GUANGDONG OPPO MOBILE TELECOMMUNICATIONS CORP., LTD., Guangdong (CN)

(72) Inventors: Qianqiang Chen, Guangdong (CN); Jing Yang, Guangdong (CN); Yongdong Zeng, Guangdong (CN); Wei Tan, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 557 days.

(21) Appl. No.: 16/183,331

(22) Filed: Nov. 7, 2018

(65) Prior Publication Data

US 2019/0148816 A1 May 16, 2019

(30) Foreign Application Priority Data

Nov. 10, 2017 (CN) .......................... 201711105665.9

(51) Int. Cl.
*H01Q 1/24* (2006.01)
*H04M 1/02* (2006.01)
(Continued)

(52) U.S. Cl.
CPC ........... *H01Q 1/243* (2013.01); *H01Q 1/2266* (2013.01); *H01Q 1/36* (2013.01); *H01Q 1/44* (2013.01);
(Continued)

(58) Field of Classification Search
CPC .. H01Q 1/24; H01Q 1/22; H01Q 1/36; H01Q 1/44; H01Q 9/42
(Continued)

(56) References Cited

U.S. PATENT DOCUMENTS 9,544,405 B1 1/2017 Kodama et al.
2014/0043199 A1* 2/2014 Grange ................ H01Q 9/0407
343/843
(Continued)

FOREIGN PATENT DOCUMENTS

CN 202524441 U 11/2012
CN 103401059 A 11/2013
(Continued)

OTHER PUBLICATIONS

International search report for Application No. PCT/CN2018/114885, dated Jan. 25, 2019 (4 pages).
(Continued)

*Primary Examiner* — Andrea Lindgren Baltzell
(74) *Attorney, Agent, or Firm* — Ladas & Parry LLP

(57) ABSTRACT

The present disclosure provides a middle frame assembly and an electronic device. The middle frame assembly includes a middle frame and an antenna radiator. The middle frame includes a metal substrate. The antenna radiator is disposed at a fringe of the metal substrate. The antenna radiator defines an escape space through the antenna radiator and configured to receive a functional component. According to the present disclosure, the antenna radiator may be disposed at the fringe of the middle frame such that the middle frame assembly may be a continuous and integral structure.

19 Claims, 10 Drawing Sheets

(51) Int. Cl.
*H01Q 1/44* (2006.01)
*H01Q 9/42* (2006.01)
*H01Q 1/36* (2006.01)
*H01Q 1/22* (2006.01)
*G06F 1/16* (2006.01)

(52) U.S. Cl.
CPC .............. *H01Q 9/42* (2013.01); *H04M 1/026* (2013.01); *G06F 1/1656* (2013.01); *G06F 1/1698* (2013.01)

(58) Field of Classification Search
USPC ........................................................ 343/702
See application file for complete search history.

(56) References Cited

U.S. PATENT DOCUMENTS

| 2014/0078008 A1 | 3/2014 | Kang et al. |
| 2015/0155614 A1* | 6/2015 | Youn ..................... G06F 1/1656 343/702 |
| 2016/0380341 A1 | 12/2016 | Han et al. |
| 2017/0111077 A1 | 4/2017 | Hwang et al. |

FOREIGN PATENT DOCUMENTS

| CN | 103579750 A | 2/2014 |
| CN | 205051738 U | 2/2016 |
| CN | 106060205 A | 10/2016 |
| CN | 206370406 U | 8/2017 |
| CN | 107948349 A | 4/2018 |

OTHER PUBLICATIONS

European search report for Application No. EP18205238.1, dated Mar. 22, 2019 (8 pages).
Indian First Examination Report, Indian Application No. 201814041745, dated Jun. 7, 2020 (5 pages).
First Office Action from China patent office in a counterpart Chinese patent Application 201711105665.9, dated May 31, 2019 (6 pages).
European Examination report for Application No. EP 18205238.1, dated Mar. 30, 2021 (7 pages).

* cited by examiner

MIDDLE FRAME ASSEMBLY AND ELECTRONIC DEVICE

CROSS-REFERENCE TO RELATED APPLICATIONS

The present application claims foreign priority of Chinese Patent Application No. 201711105665.9, filed on Nov. 10, 2017 in the State Intellectual Property Office of China, the entire contents of which are hereby incorporated by reference.

TECHNICAL FIELD

The described embodiments relate to the electronic device field, and in particular to a middle frame assembly and an electronic device.

BACKGROUND

As the development of internet technology and the improvement of intelligence of electronic devices, the electronic device is used to achieve more and more functions such as calling, chatting and gaming.

When the user uses the electronic device to make a call or to chat with someone else, the electronic device transmits signals by an antenna thereof. In related art, the electronic device may include a middle frame. The outer edge of the middle frame may define one or more openings, and the antenna(s) of the electronic device may be inserted in the openings.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

Figures 1, 2:
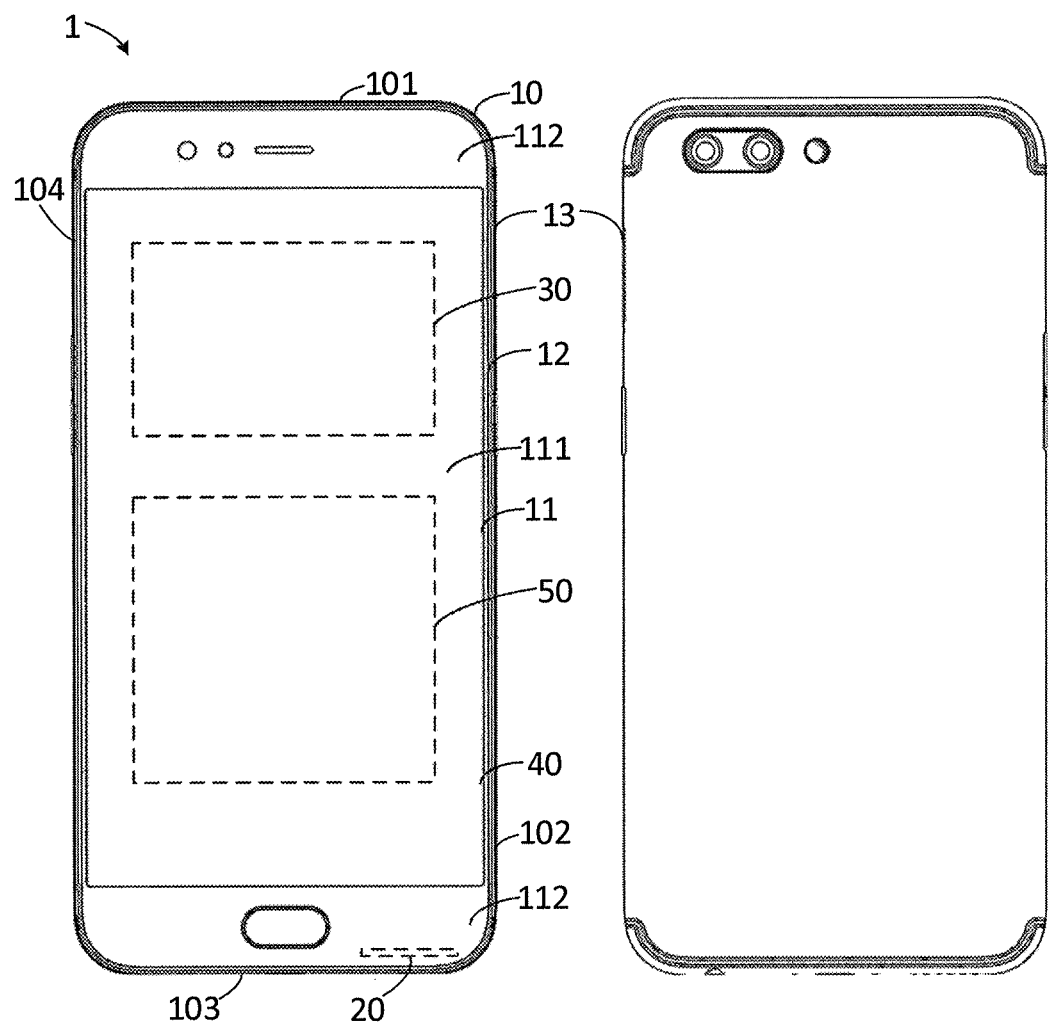
FIG. 1 is a schematic structural view of an electronic device according to an embodiment of the present disclosure.
FIG. 2 is a schematic structural view of an electronic device according to another embodiment of the present disclosure.

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present disclosure without creative efforts shall fall within the protection scope of the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention. "a plurality of" means two or more than two, unless specified otherwise.

In the present disclosure, unless specified or limited otherwise, terms "mounted", "connected", "coupled" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the present invention, unless specified or limited otherwise, a structure in which a first feature is "on" or "below"

a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

The present disclosure provides a metal base, a middle frame assembly and an electronic device. The detailed description will be given below.

In an aspect, a middle frame assembly is provided. The middle frame assembly may be used in various electronic devices such as cell phone, laptop, personal digital assistant and the like.

FIG. 1 illustrates an electronic device according to an embodiment of the present disclosure. The electronic device may include a case 10, an antenna radiator 20, a printed circuit board (PCB) 30, a display screen 40 and a battery 50.

The case 10 may include a cover plate 11, a middle frame 12 and a back case 13. The cover plate 11, the middle frame 12 and the back case 13 may cooperatively constitute the case 10. The cover plate 11, the middle frame 12 and the back case 13 of the case 10 may cooperatively define a closed space, which is utilized to accommodate the antenna radiator 20, the PCB 30, the display screen 40 and the battery 50. In some embodiments, the cover plates 11 may be set on the middle frame 12. The back case 13 may also be set of the middle frame but at another side of the middle frame 12 opposite to the cover plate 11. That is, the cover plate 11 and the back case 13 may be arranged to be opposite to each other. The closed spaced of the case 10 is between the cover plate 11 and the back case 13.

In some embodiments, the case 10 may be a metal case. It should be note that the material of the case 10 is not limited in the present disclosure. For example, the case 10 may include a metal portion and a non-metal portion. In other embodiments, the case 10 may be a plastic case. For example, the case 10 may be a case structure made of both metal and plastic. In some embodiments, the cover plate 11 may be a transparent glass cover plate. In some embodiments, the cover plate 11 may be made or sapphire or other material.

It should be noted that the structure of the case is not limited in the present disclosure. For example, the back case and the middle frame may be integrally formed, which may be referred to as a middle frame 12. In this circumstance, the case 10 may include the cover plate 11 and the middle frame 12. The cover plate 11 and the middle frame 12 may be fixed together to form a closed space. The closed space may be configured to accommodate the antenna radiator 20, the PCB 30, the display screen 40 and the battery 50.

The fringe of the case 10 may include a first side portion 101, a second side portion 102, a third side portion 103 and a fourth side portion 104. The first side portion may be opposite to the third side portion 103, and the second side portion 102 may be opposite to the fourth side portion 104.

FIG. 2 illustrates an electronic device according to another embodiment of the present disclosure. On the fringe of the case 10 may be arranged a headphone hole 105, a microphone hole 106, a loudspeaker hole 108, a USB interface hole 107. The headphone hole 105, the microphone hole 106, the loudspeaker hole 108 and the USB interface hole 107 may all be through holes.

The antenna radiator 20 may be installed inside the case 10. The antenna radiator 20 may be configured to transmit wireless signals or to receive wireless signals sent by other electronic devices. The antenna radiator 20 may be a radio frequency (RF) antenna, a Bluetooth antenna, a WiFi antenna etc.

In some embodiments, the antenna radiator 20 may be disposed on the cover plate 11, on the middle frame 12, or on the back case 13. In some embodiments, when the antenna radiator 20 is disposed on the middle frame 12, the antenna radiator 20 and the middle frame 12 may constitute a middle frame assembly. That is, the middle frame assembly may include the middle frame 12 and the antenna radiator 20.

The antenna radiator 20 may be integrally formed with the middle frame 12. Specifically, the middle frame 12 may include a metal substrate, e.g., a metal substrate made of magnesium alloy. Alternatively, the antenna radiator 20 may be made of magnesium alloy, and the metal substrate and the antenna radiator 20 may be connected by injection molding in one process. Alternatively, the antenna radiator 20 may be detachably fixed on the middle frame 12. For example, screws may be utilized to fix the antenna radiator 20 on the middle frame 12. It should be noted that the method for fixing the antenna radiator 20 and the middle frame 12 are not limited to the above-mentioned methods. Other methods such as clamping, inserting, or connecting by glue may alternatively be utilized. The antenna radiator may be set at the fringe of the metal substrate. The middle frame assembly may be integrally formed. Thus, the middle frame assembly may be a continuous and integral structure having a large strength. Therefore, the implementation of the present disclosure may increase the strength of the middle frame.

In some embodiments, the antenna radiator 20 may be set on the third side portion 103 of the case 10. The antenna radiator 20 may be adjacent to the third side portion 103 of the case 10. In other words, the antenna radiator 20 may be close to the third side portion 103 of the case 10. Also, the antenna radiator 20 may be close to the second side portion 102. Specifically, the antenna radiator 20 may be located at the corner between the third side portion 103 and the second side portion 102.

Figure 3:
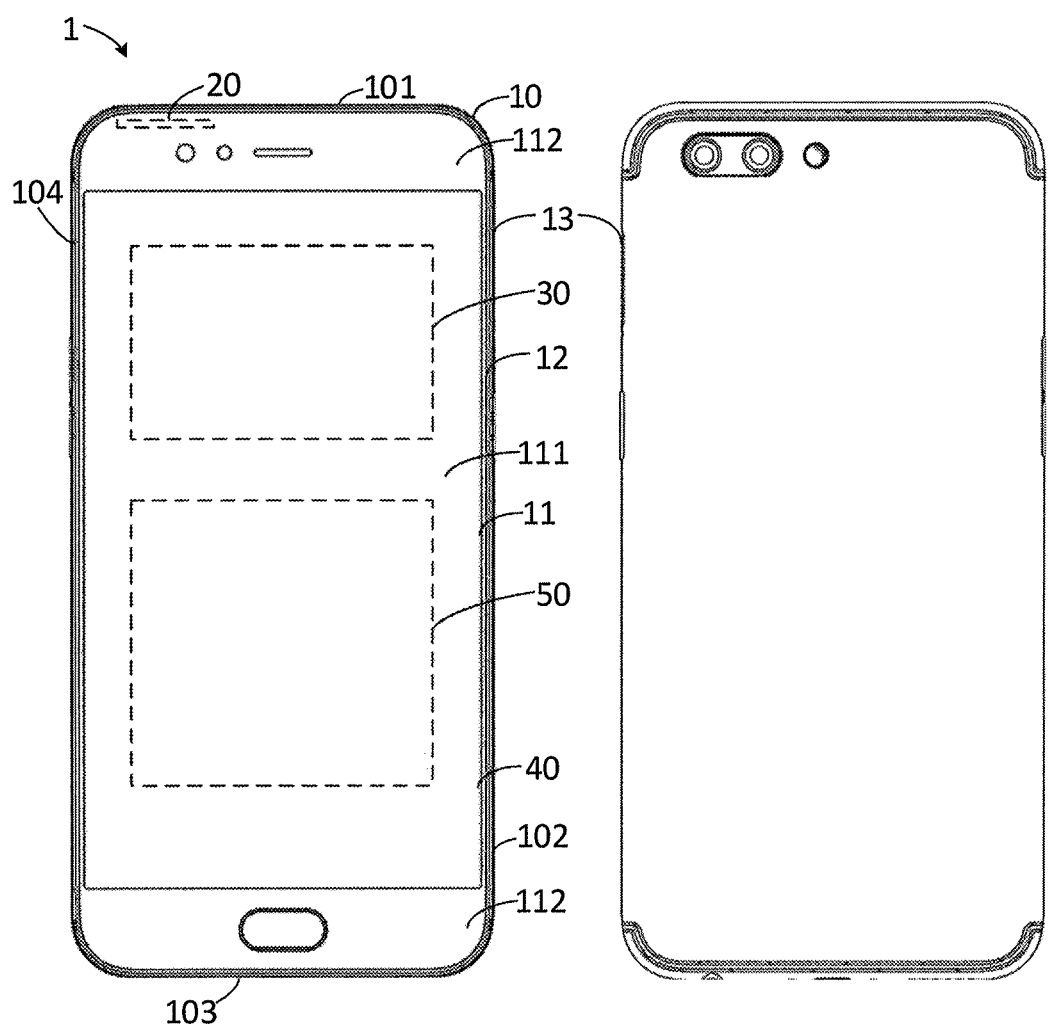
FIG. 3 is a schematic structural view of an electronic device according to another embodiment of the present disclosure.

It should be noticed that, the antenna radiator 20 may alternatively be set on other positions. FIG. 3 illustrates an electronic device according to another embodiment of the present disclosure. The differences between the electronic device of FIG. 3 and the electronic device of FIG. 1 are as follows. The antenna radiator 20 may be set at the first side portion 101 of the case 10. The antenna radiator 20 may also be close to the fourth side portion 104 or to the second side portion 102. It should be noted that, in other embodiments, the antenna radiator 20 may alternatively be located at the second side portion 102 of the case 10, or be located at the fourth side portion 104 of the case 10, which is not limited hereon.

The PCB 30 may be installed inside the case 10. The PCB 30 may be the main board of the electronic device 1. One, two or more of functional components such as motor, microphone 62, loudspeaker 64, headphone jack 61, USB interface 63, camera, distance sensor, environment light sensor, receiver or processer may be integrated on the PCB 30. The PCB 30 may include a microphone 62, a loudspeaker 64, a headphone jack 61 and a USB interface 63. The headphone jack 61 may be located corresponding to the headphone hole 105. The microphone 62 may be located corresponding to the microphone hole 106. The USB interface 63 may be located corresponding to the USB interface 107. The loudspeaker 64 may be located corresponding to the loudspeaker hole 108.

In some embodiments, the PCB 30 may be fixed inside the case 10. Specifically, the PCB 30 may be fixed onto the middle frame 12 by screws, or the PSB 30 may be clamped onto the middle frame 12. It should be noted that, the method for fixing the PCB 30 onto the middle frame 12 is not limited in the present disclosure. Other methods and components such as clips and screws may also be used.

The battery 50 may be installed inside the case 10. The battery 50 may be electrically connected to the PCB 30 so as to power the electronic device 1. The case 10 may be the battery case of the battery 50. The case 10 may cover the battery 50 to protect the battery 50. Specifically, the back case may cover and protect the battery 50, such that damage to the battery due to collision or falling of the electronic device 1 may be reduced.

The display screen 40 may be installed inside the case 10. The display screen 40 may be electrically connected to the PCB 30 so as to form the display surface of the electronic device 1. The display screen 40 may include a display portion 111 and a non-display portion 112. The display portion 111 may be configured to display images on the electronic device 1, and it can also be the touch-control area for the user. At the top part of the non-display portion 112 there may be defined openings for the transmission of sound and light. At the bottom part of the non-display portion 112 there may be arranged functional components such as fingerprint module and touch-control button. The cover plate 11 may be assembled on and cover the display screen 40. Accordingly, the cover plate 11 may also have a display region and a non-display region, which is similar to the display portion and the non-display portion of the display screen 40.

Figure 4:
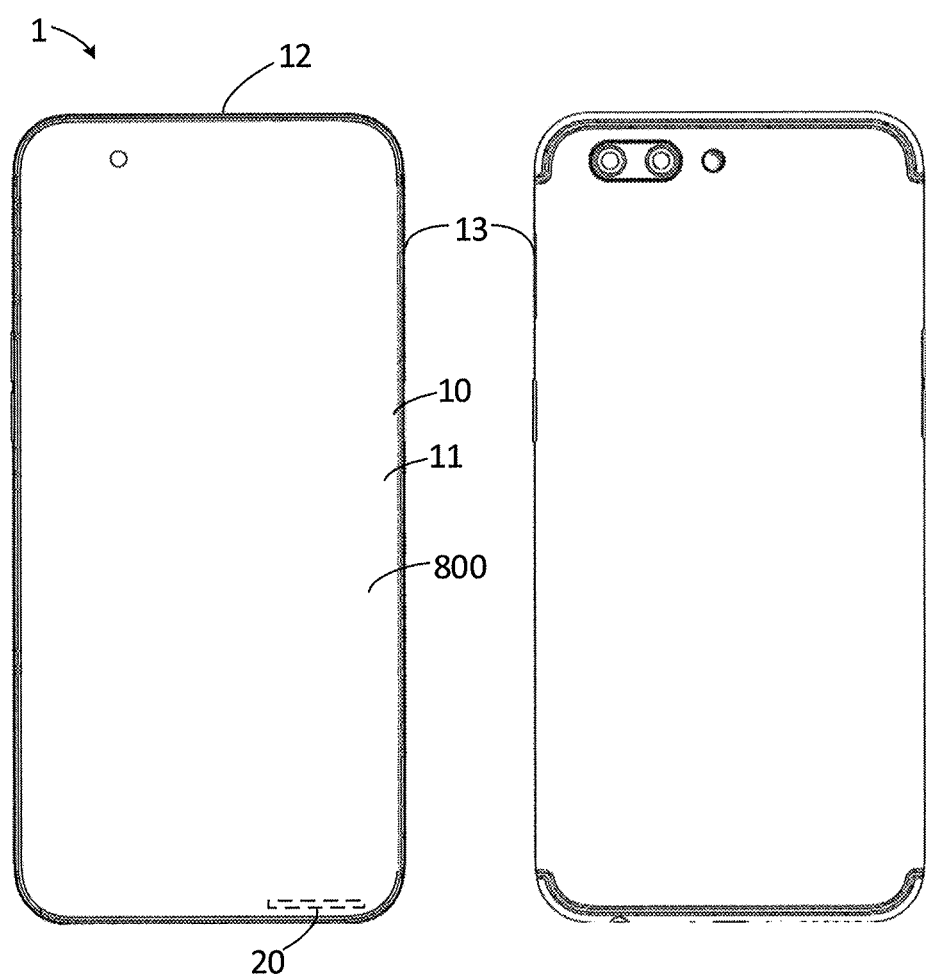
FIG. 4 is a schematic structural view of an electronic device according to another embodiment of the present disclosure.

It should be noted that the structure of the display screen 40 is not limited hereon. For example, the display screen may be a bezel-less screen or a screen of irregular shape. FIG. 4 illustrate an electronic device according to an embodiment of the present disclosure. Differences between the electronic device of FIG. 4 and the electronic device of FIG. 1 are as follows. The non-display region may be directly formed on the display screen 40. For example, the non-display region of the display screen 40 may be a transparent structure or a through hole which may allow light to pass. Alternatively, an opening may be directly formed in the non-display portion of the display screen 40, which allows light to pass. The front camera, the distance sensor, the environment light sensor may be disposed in the non-display region. Thus the camera may take photos and the sensors may function normally.

It should be noted that, in other embodiments, the display screen 40 does not include the non-display portion. In this situation, the display screen 40 may be a bezel-less screen, and the distance sensor and the environment light sensor may be located below the display screen.

Figure 5:
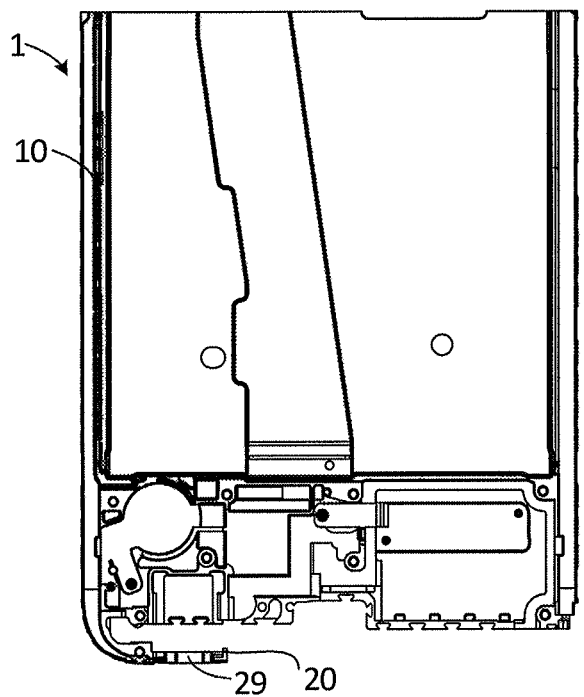
FIG. 5 is a schematic structural view of an electronic device according to another embodiment of the present disclosure.

In some embodiments, the antenna radiator 20 may be set at the fringe of the case 10. It should be understood, during the installation of the functional component 60 and the antenna radiator 20 on the case 10, these components may need to be overlapped or stacked together, which requires a large inner space of the electronic device 1. In this situation, the thickness of the electronic device 1 will be increased. FIG. 5 illustrates part of the electronic device according to an embodiment of the present disclosure. In some embodiments, the antenna radiator 20 may be fixed on the case 10. The antenna radiator 20 may define an escape space 29 through the antenna radiator. Specifically, the escape space 29 may extend outwards from the case 10 and through the antenna radiator 20. The escape space 29 may be utilized to receive a functional device.

Figure 6:
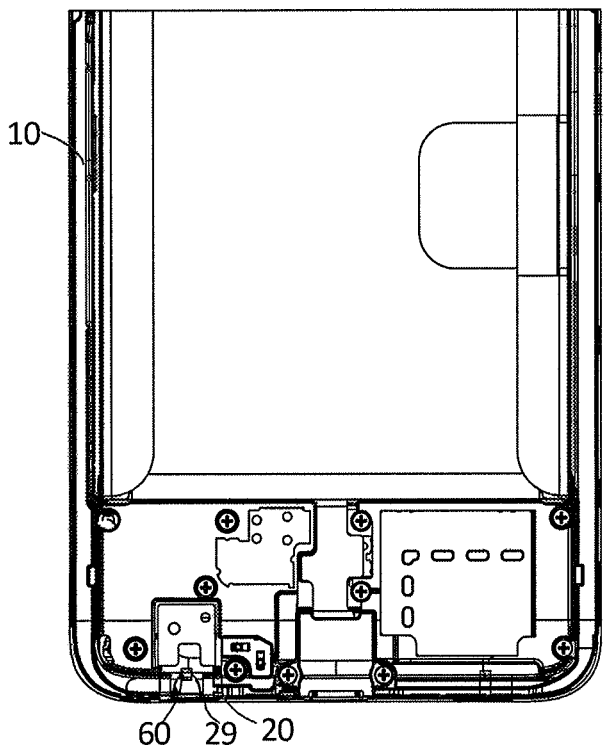
FIG. 6 is a schematic structural view of part of an electronic device according to another embodiment of the present disclosure.

Accordingly, in this embodiment, during the installation of the functional component 60, the functional component 60 may be received in the escape space 29. For example, referring to FIG. 6, FIG. 6 is a schematic structural view of an electronic device according to another embodiment of the present disclosure. In FIG. 6, the functional device 60 may be received in the escape space 29. The escape space 29 may alternatively be utilized to receive other components. Alternatively, the escape space 29 may be utilized to transmit signals such as sound signal and light signal. Thus, the height of the overlapped portion of the functional component 60 and the antenna radiator 20 during installation may be reduced as well as space occupied by the functional component 60 and the antenna radiator 20. Therefore, the electronic device 1 may be thinner and lighter.

Figure 7:
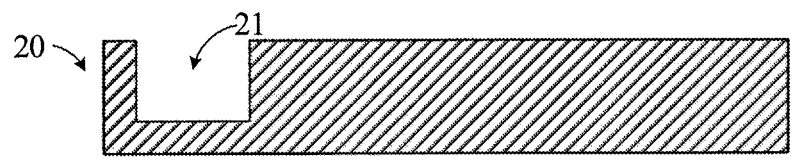
FIG. 7 illustrates an exemplary structure of an antenna radiator according to an embodiment of the present disclosure.
Figure 8:
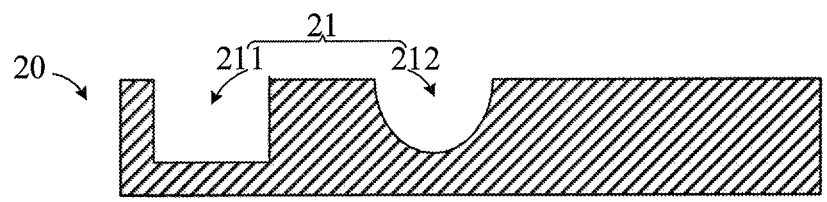
FIG. 8 illustrates an exemplary structure of an antenna radiator according to another embodiment of the present disclosure.

In some embodiments, referring to FIG. 7, FIG. 7 illustrates an antenna radiator according to an embodiment of the present disclosure. The antenna radiator 20 may define an escape slot 21. In other word, the escape space 29 may include the escape slot 21 which extends through the antenna radiator 20. The number of the escape slot(s) 21 may be one, two or more. For example, referring to FIG. 8, FIG. 8 illustrates an antenna radiator according to another embodiment of the present disclosure. The differences of the antenna radiator shown in FIG. 8 from the antenna radiator shown in FIG. 7 are as follows. The antenna radiator 20 shown in FIG. 8 may include a first escape slot 211 and a second escape slot 212. That is, the escape slot 21 may include the first escape slot 211 and the second escape slot 212. It should be noted that, the escape slot 21 may further include a third escape slot or more escape slots in other embodiments. The escape slot 21 may be rectangular or have a curved configuration. It should be understood, the escape slot 21 may also have different configurations. For example, the escape slot 21 may have an irregular shape.

Figure 9:
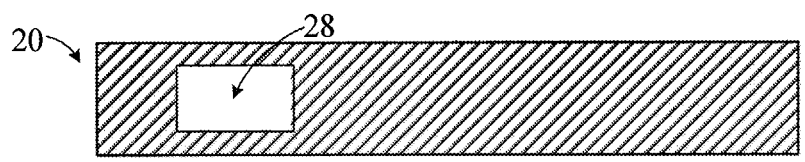
FIG. 9 illustrates an exemplary structure of an antenna radiator according to another embodiment of the present disclosure.
Figure 10:
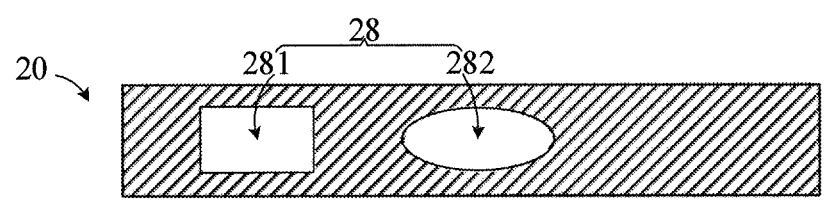
FIG. 10 illustrates an exemplary structure of an antenna radiator according to another embodiment of the present disclosure.

In some embodiments, referring to FIG. 9, FIG. 9 illustrates an exemplary structure of an antenna radiator according to another embodiment of the present disclosure. The antenna radiator 20 may define an escape hole 28. That is, the escape space 29 may include the escape slot 28 which extends through the antenna radiator 20. The escape hole 28 may be a through hole. Further, the number of the escape hole(s) 28 may be one, two or more. For example, referring to FIG. 10, FIG. 10 illustrates an exemplary structure of an antenna radiator according to another embodiment of the present disclosure. The differences of the antenna radiator shown in FIG. 10 from the antenna radiator shown in FIG. 9 are as follows. The antenna radiator 20 shown in FIG. 10 may include a first escape hole 281 and a second escape hole 282. In other words, the escape hole 28 may include the first escape hole 281 and the second escape hole 282. It should be noted that the escape hole 28 may further include a third escape hole or more escape holes in other embodiments. In some embodiments, the escape hole may have a rectangular configuration, a circular configuration or an oval configuration. It should be understood that, the escape hole 28 may also have different configurations. For example, the escape hole 28 may have an irregular shape.

Figure 11:
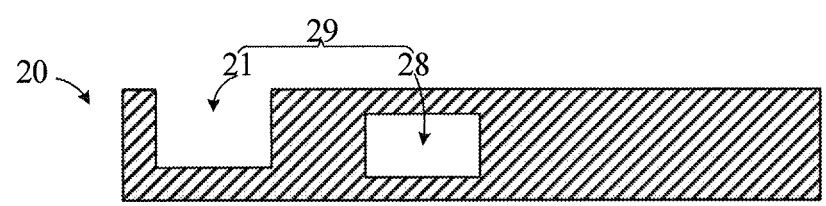
FIG. 11 illustrates an exemplary structure of an antenna radiator according to another embodiment of the present disclosure.

It should be noted that the structure of the escape space 29 of the present disclosure is not limited to the above descriptions. For example, the escape space 29 may include both the slot and the through hole. Specifically, referring to FIG. 11, FIG. 11 illustrates an exemplary structure of an antenna radiator according to another embodiment of the present disclosure. The antenna radiator 20 may include an escape slot 21 and an escape hole 28. That is, the escape space 29 may include an escape slot 21 and an escape hole 28. The escape space 29 may include at least one escape slot 21 and at least one escape hole 28. The configuration of the escape hole and the escape slot may be similar to the above descriptions and will not be repeated hereon.

Figure 12:
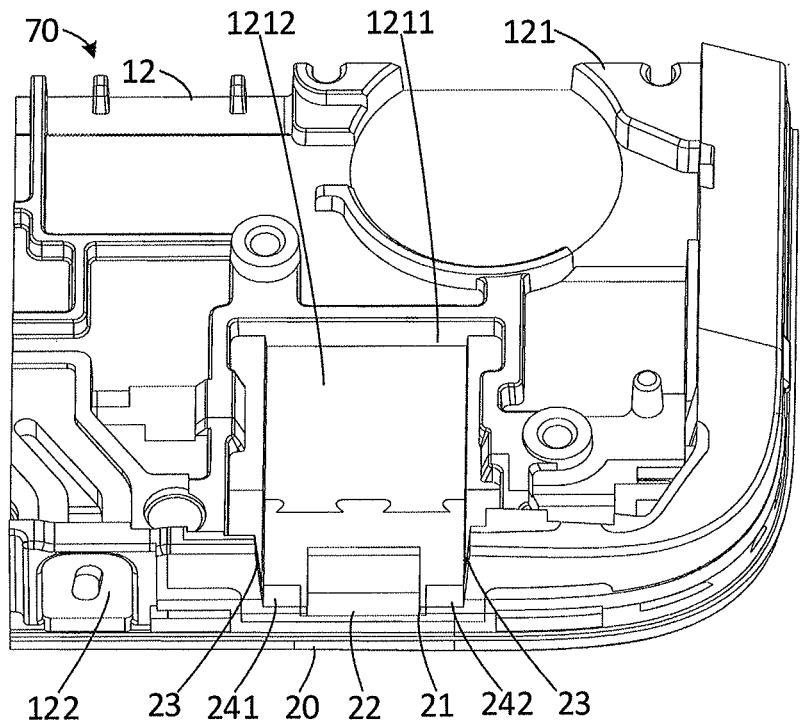
FIG. 12 is a perspective view of a middle frame assembly according to an embodiment of the present disclosure.

In some embodiments, the antenna radiator 20 may be fixed at the fringe of the case 10 so as to form the case assembly. Specifically, the antenna radiator 20 may be fixed at the fringe of the middle frame 12 so as to form the middle frame assembly. Specifically, referring to FIG. 12, FIG. 12 illustrates a middle frame assembly according to an embodiment of the present disclosure. The middle frame assembly 70 may include a middle frame 12 and an antenna radiator 20.

The antenna radiator 20 may be made of magnesium alloy. It should be noted that, the structure of the antenna radiator 20 may be similar to that described in any one of above-mentioned embodiments, and will not be repeated hereon. The antenna radiator 20 may define an escape slot 21. In this embodiment, the escape slot 21 will be taken as example of the escape space 29.

The middle frame 12 may include a metal substrate 121 and a non-metal substrate 122 connected together. The metal substrate 121 and the non-metal substrate 122 may be connected together by injection molding so as to form a middle frame 12 having an integral structure. It is appreciated that the structure of the middle frame 12 may be similar to that described in any one of above-mentioned embodiments, and will not be repeated hereon.

Figure 13:
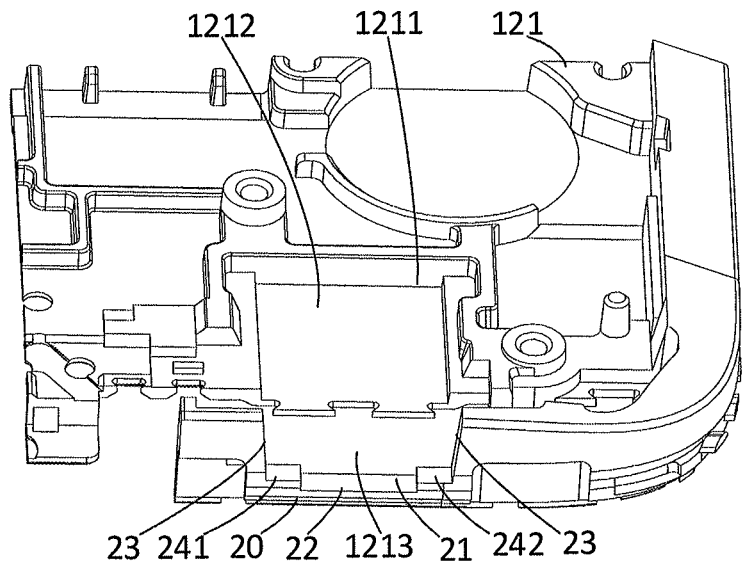
FIG. 13 shows an exemplary structure where a metal substrate and an antenna radiator are fixedly connected according to an embodiment of the present disclosure.
Figure 14:
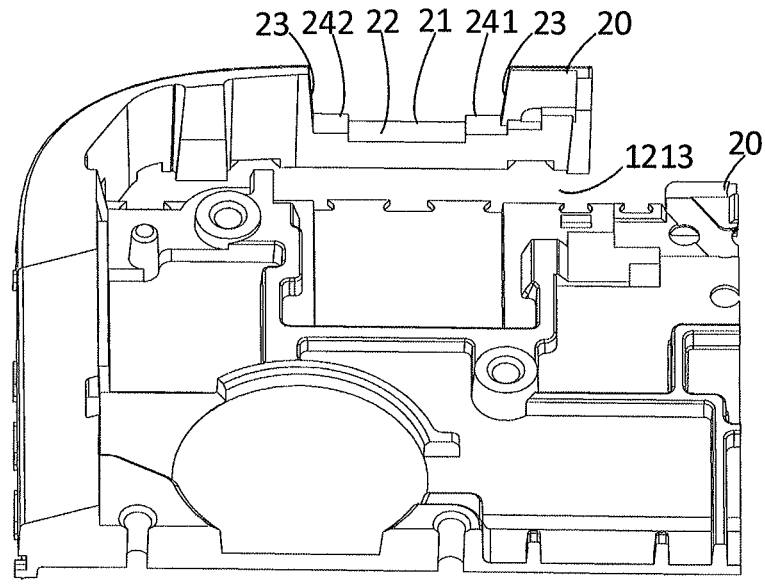
FIG. 14 shows another exemplary structure where a metal substrate and an antenna radiator are fixedly connected according to an embodiment of the present disclosure.

The material of the metal substrate 121 may be magnesium alloy. Specifically, referring to FIGS. 13 and 14, FIG. 13 shows an exemplary structure where a metal substrate and an antenna radiator are fixedly connected according to an embodiment of the present disclosure, and FIG. 14 shows another exemplary structure where a metal substrate and an antenna radiator are fixedly connected according to an embodiment of the present disclosure. The metal substrate 121 may define a receiving slot 1211. The receiving slot 1211 may be directly formed on the surface of the metal substrate 121. The receiving slot 1211 may be utilized to receive a functional component 60. Thus, the inside space may be saved, and the position of the functional component 60 may be well fixed. The metal substrate 121 may have a first bottom wall 1212 at the receiving slot 1211. When received in the receiving slot 1211, the functional component 60 is clung to the first bottom wall 1212. Thus, the first bottom wall 1212 may support the functional component 60.

In some embodiments, the antenna radiator 20 may be set at the fringe of the metal substrate 121. The antenna radiator 20 and the metal substrate 121 may be integrally formed. For example, the antenna radiator 20 and the metal substrate 121 may be put in a same mold and connected together by injection molding. The antenna radiator 20 may extend outwards from the fringe of the metal substrate 121. It should be noted that, in other embodiments, the antenna radiator 20 may be fixedly connected to the metal substrate 121 by, for example, welding or other fixing methods. Alternatively, the antenna radiator 20 may be detachably connected with the metal substrate 121. There may exist a gap 1213 between the antenna radiator 20 and the metal substrate 121.

In some embodiments, the escape slot 21 may extend outwards from the gap 1213 to the antenna radiator 20 and through the antenna radiator 20.

The non-metal substrate 122 may be made of plastic. After the metal substrate 121 has been formed. The middle frame 12 may be formed by performing injection molding on the metal substrate 122. The non-metal substrate 122 may be filled in the gap 1213 such that the antenna radiator 20 and the metal substrate 121 may be integrally connected. Thus, the structure strength may be increased.

In some embodiments, various functional components 60, e.g., headphone jack, receiver, microphone, may be installed in the escape slot 21 or the escape hole 28. In other words, various functional components 60 may be received in the escape slot 21 or the escape hole 28. In this embodiment, a headphone jack may be taken as an example of the functional component 60 received in the escape slot 21.

Figure 15:
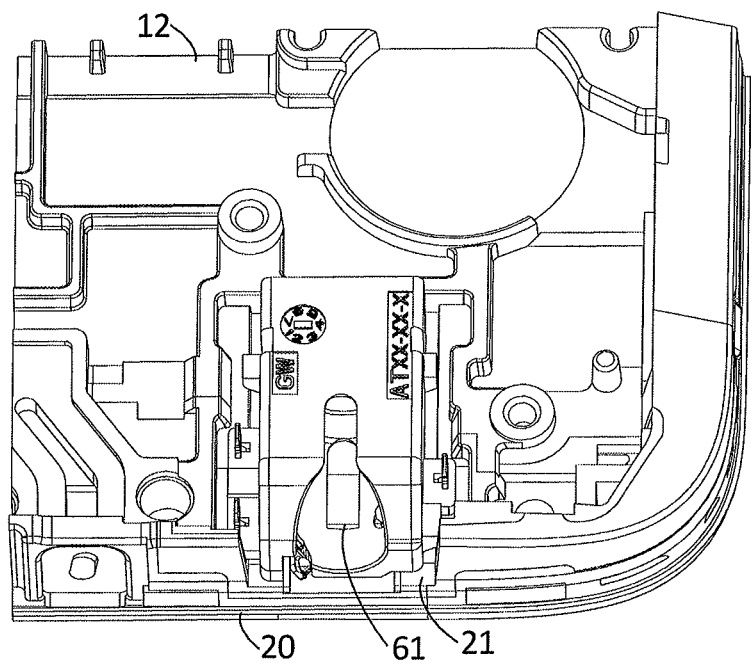
FIG. 15 shows an exemplary structure where a middle frame assembly and a headphone jack are matched according to an embodiment of the present disclosure.

Referring to FIG. 15, FIG. 15 shows an exemplary structure where a middle frame assembly and a headphone jack are matched according to an embodiment of the present disclosure. The headphone jack 61 may be set on the middle frame and located at the escape slot 21. Specifically, the headphone jack 61 may be received in the receiving slot 1211 of the metal substrate 121 and also in the escape slot 21. A portion of the headphone jack 61 may be received in the receiving slot 1211 of the metal substrate 121, and another portion of the headphone jack 61 may be received in the escape slot 21. It should be noticed that, in other embodiments, the headphone jack 61 may not be received in the escape slot 21. In this situation, the escape slot 21 may be utilized to receive other components or let signals pass.

In some embodiments, the escape slot 21 may include a first bottom wall 22 and two side walls 23. A step structure 24 may be formed on the first bottom wall 22. In some embodiments, the step structure 24 may include a first step 241 and a second step 242. The first step 241 may be located close to one of the two side walls 23 while the second step 242 may be located close to the other of the two side walls 23. The height of the first step 241 may be substantially equal to the height of the second step 242. The first step 241 and the second step 242 may cooperatively limit the position of the headphone jack 61 such that the headphone jack 61 may be well positioned. It should be noted that, in other embodiments, there may be arranged no step or only one step, and the heights of the first step and the second step may be different. The structure of the escape slot 21 may be designed based on the actual structure of the headphone jack 61.

In some embodiments, the receiving slot 1211 may be connected with the escape slot 21. The headphone jack 61 may be directly disposed in the receiving slot 1211 and the escape slot 21 at the same time. The second bottom wall 1212 of the receiving slot 1211 and the first bottom wall 22 of the escape slot 21 may be located at the same plane. Thus, the headphone jack 61 may be stably disposed in the receiving slot 1211 and the escape slot 21. The headphone jack 61 may be well supported and positioned.

The metal substrate 121 may be acquired by machining or purchased directly.

Figure 16:
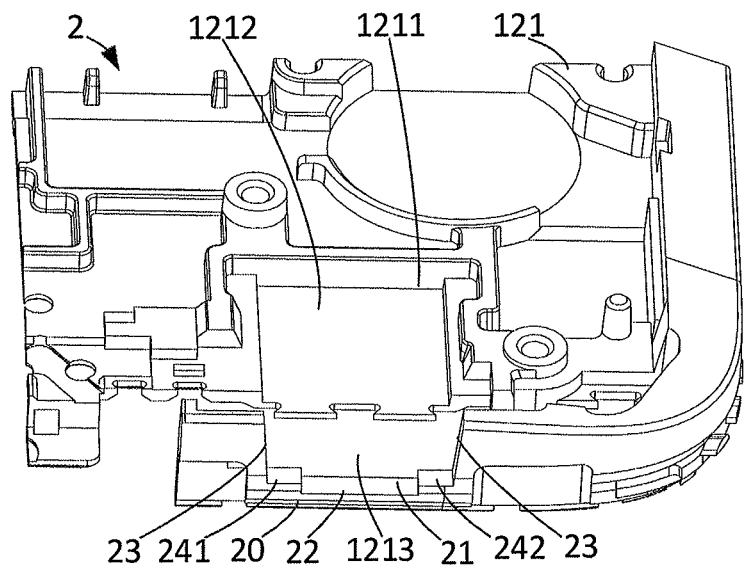
FIG. 16 is a schematic structural view of a metal base according to an embodiment of the present disclosure.
Figure 17:
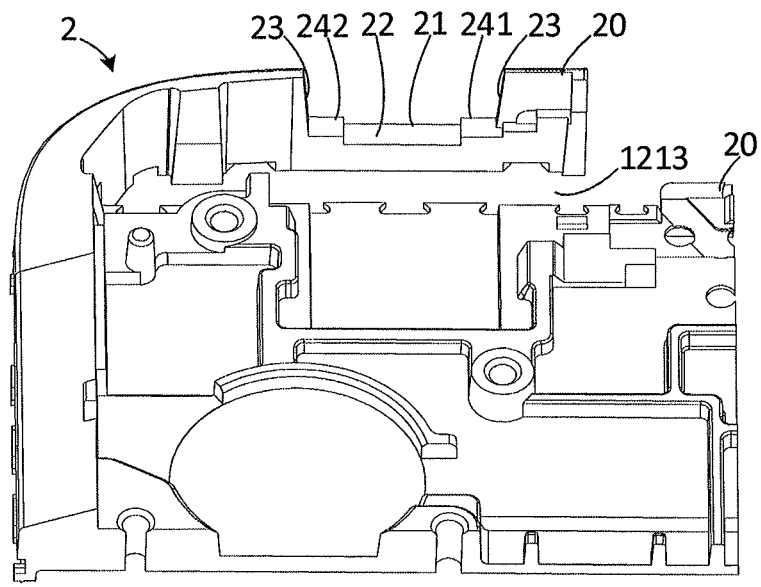
FIG. 17 is a schematic structural view of a metal base according to another embodiment of the present disclosure.

During the machining process, the metal substrate 121 and the antenna radiator 20 may be connected integrally within one process. The integration of the metal substrate 121 and the antenna radiator 20 may be referred to as a metal base. When it is purchased, the metal substrate 121 and the antenna radiator 20 may generally be integrally connected. In this situation, the integration of the metal substrate 121 and the antenna radiator 20 may similarly be referred to as a metal base. FIG. 16 illustrates a metal base according to an embodiment of the present disclosure, and FIG. 17 illustrates a metal base according to another embodiment of the present disclosure. The metal base 2 may include a metal substrate 121 made of magnesium alloy and an extending portion 20.

The extending portion 20 may be utilized as an antenna radiator for sending and receiving signals. The structure of the extending portion 20 may be similar to the antenna radiator described in any one of the above-mentioned embodiments, and will not be repeated hereon.

Similarly, the structure of the metal substrate 121 may be similar to that described in any one of the above-mentioned embodiments, and will not be repeated hereon.

Those of ordinary skill in the art should understand, the description of the electronic device 1 shown in FIGS. 1 and 2 are not intended to limit the structure of the electronic device 1. For example, the electronic device 1 may include more or less components as that shown in the figures. Different components may be combined together or be arranged in a different way. In some embodiments, the electronic device 1 may further include a memory, a Bluetooth module and the like.

Figure 18:
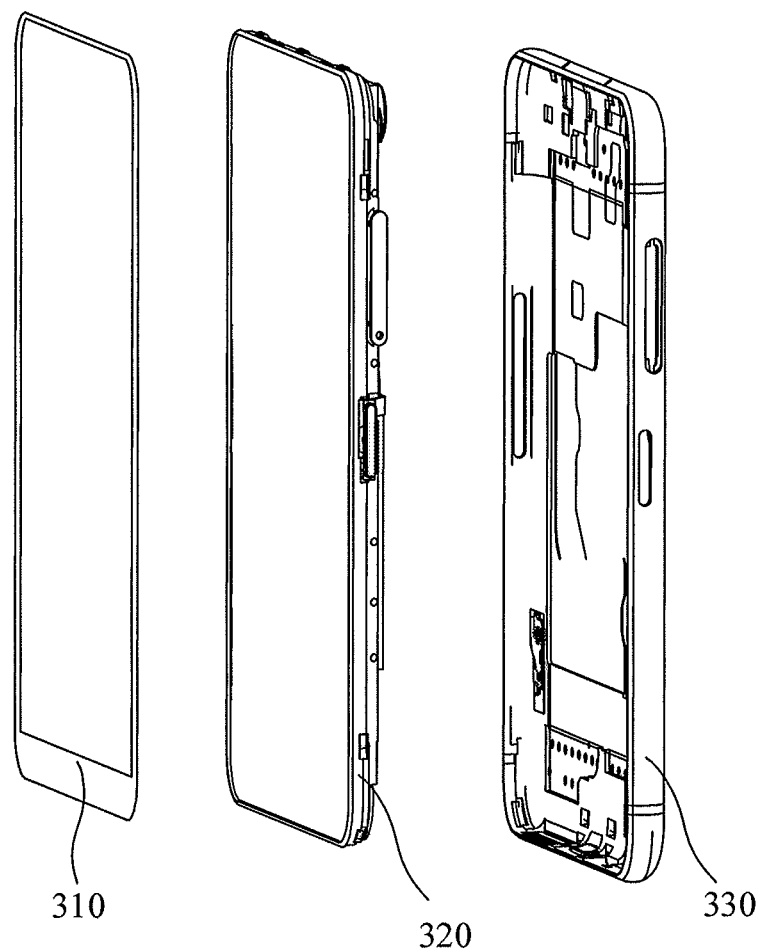
FIG. 18 shows an exploded view of an electronic device according to an embodiment of the present disclosure.
Figure 19:
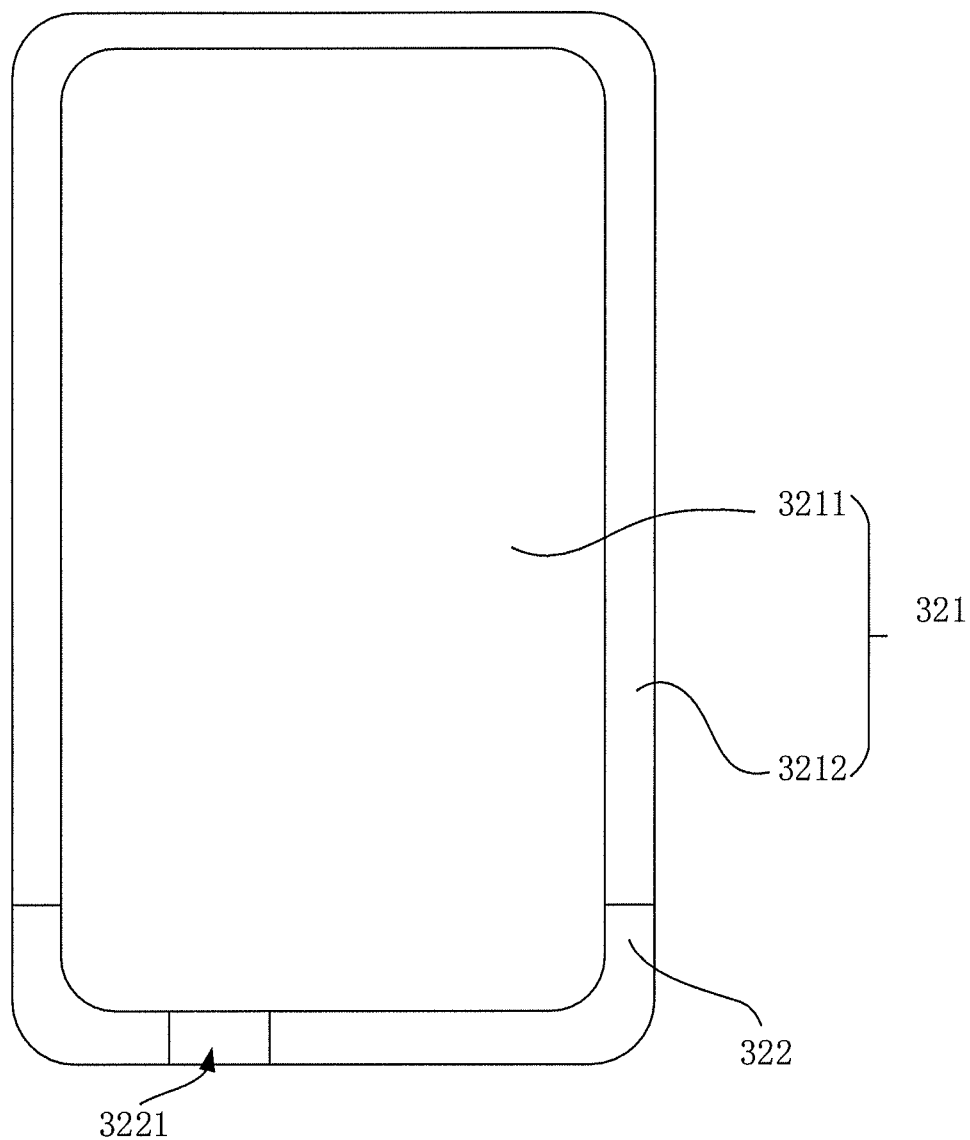
FIG. 19 shows an exemplary structure of the middle frame of the electronic device shown in FIG. 18.

The present disclosure further provides an electronic device. Referring to FIGS. 18 and 19, FIG. 18 shows an exploded view of an electronic device according to an embodiment of the present disclosure, and FIG. 19 shows an exemplary structure of the middle frame assembly of the electronic device shown in FIG. 18.

As shown in FIG. 18, the electronic device 300 may include a display screen 310, a middle frame assembly 320 and a back case 330. The middle frame assembly 320 may be disposed between the display screen 310 and the back case 330.

As shown in FIG. 19, the middle frame assembly 320 may include a middle frame 321 and an antenna radiator 322, where the middle frame 321 may include a metal substrate 3211 and a fringe portion 3212 surrounding partially the metal substrate 3211. The fringe portion 3212 may be made of metal and/or plastic. The thickness of the fringe portion 3212 may be larger than that of the metal substrate 3211 such that the fringe portion 3212 and the metal substrate 3211 may cooperatively define an accommodating space for installing other components of the electronic device 300, e.g., a printed circuit board. The antenna radiator 322 may connect to the fringe portion 3212 such that the antenna radiator 322 and the fringe portion 3212 may constitute an outer frame surrounding the metal substrate 3211. The antenna radiator 322 may be made of magnesium alloy and used for transmitting signals. The middle frame 321 and the antenna radiator 322 may be integrally connected by, for example, injection molding such that the outer frame of the metal substrate 3211 which consists of the antenna radiator 322 and the fringe portion 3212 may be a continuous and integral structure.

The antenna radiator 322 may define an escape space 3221 therethrough. Similar to the embodiments described above, the escape space 3221 may include at least one escape slot(s) and/or at least one escape hole(s). Although not shown, those skilled in the art should understand that, when the middle frame assembly 320 is assembled in the electronic device 300, a functional device (or functional devices) such as headphone jack may be received in the escape space 3221. The structures of the metal substrate 3211, the middle frame 321, the antenna radiator 322 and the escape space 3221 may be similar to those described in the above embodiments and will not be described hereon.

The metal base, the middle frame assembly and the electronic device of the present disclosure have been described in detail in the above embodiments. While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A middle frame assembly, comprising:
  a middle frame comprising a metal substrate and a non-metal substrate connected together; and
  an antenna radiator disposed at a fringe of the metal substrate, wherein the antenna radiator is integrally formed or connected with the metal substrate and defines an escape space through the antenna radiator and configured to receive a functional component;
  wherein there is a gap between the antenna radiator and the metal substrate, and the non-metal substrate is filled in the gap to integrally connect the antenna radiator with the metal substrate.

2. The middle frame assembly of claim 1, wherein the escape space comprises at least one escape slot defined in the antenna radiator, and the at least one escape slot extends through the antenna radiator.

3. The middle frame assembly of claim 2, wherein the escape space comprises a first bottom wall and two side walls cooperatively defining the at least one escape slot; and a step structure is formed on the first bottom wall.

4. The middle frame assembly of claim 3, wherein the step structure comprises a first step located close to one of the two side walls and a second step located close to the other of the two side walls.

5. The middle frame assembly of claim 4, wherein a height of the first step is substantially equal to a height of the second step.

6. The middle frame assembly of claim 2, wherein the metal substrate defines a receiving slot which is communicated to the at least one escape slot.

7. The middle frame assembly of claim 6, wherein
  the escape space comprises a first bottom wall and two side walls cooperatively defining the at least one escape slot; and
  a second bottom wall of the receiving slot is located in a same plane as the first bottom wall of the at least one escape slot.

8. The middle frame assembly of claim 1, wherein the escape space comprises at least one escape hole defined in the antenna radiator, and the at least one escape hole extends through the antenna radiator.

9. The middle frame assembly of claim 1, wherein the metal substrate defines a receiving slot communicated to the escape space.

10. The middle frame assembly of claim 1, wherein the antenna radiator is made of magnesium alloy.

11. The middle frame assembly of claim 1, wherein the non-metal substrate is fixedly connected to the metal substrate.

12. A middle frame assembly, comprising:
a middle frame comprising a metal substrate and a non-metal substrate connected together, and a fringe portion surrounding partially the metal substrate; and
an antenna radiator integrally connecting to the fringe portion such that the fringe portion and the antenna radiator constitute an outer frame surrounding the metal substrate,
wherein the antenna radiator is integrally formed or connected with the metal substrate;
wherein the antenna radiator defines an escape space through the antenna radiator, and the escape space is configured to receive a functional component;
wherein there is a gap between the antenna radiator and the metal substrate, the non-metal substrate is filled in the gap to integrally connect the antenna radiator with the metal substrate.

13. The middle frame assembly of claim 12, wherein the antenna radiator is made of magnesium alloy.

14. The middle frame assembly of claim 12, wherein the escape space comprises at least one escape slot.

15. The middle frame assembly of claim 14, wherein the metal substrate defines a receiving slot, and a bottom wall of the receiving slot is substantially flush with a bottom wall of the at least one escape slot.

16. The middle frame assembly of claim 12, wherein the escape space comprises at least one escape hole.

17. An electronic device with a middle frame assembly, the middle frame assembly comprising:
a middle frame comprising a metal substrate and a non-metal substrate connected together, and a fringe portion surrounding partially the metal substrate; and
an antenna radiator connecting to the fringe portion such that the fringe portion and the antenna radiator constitute an outer frame surrounding the metal substrate,
wherein the antenna radiator is integrally formed or connected with the metal substrate;
wherein the antenna radiator defines an escape space through the antenna radiator;
wherein there is a gap between the antenna radiator and the metal substrate, the non-metal substrate is filled in the gap to integrally connect the antenna radiator with the metal substrate.

18. The electronic device of claim 17, further comprising a functional component received in the escape space.

19. The electronic device of claim 17, wherein the middle frame and the antenna radiator are integrally connected.

* * * * *